US007010519B2

(12) United States Patent
Tada et al.

(10) Patent No.: US 7,010,519 B2
(45) Date of Patent: Mar. 7, 2006

(54) METHOD AND SYSTEM FOR EXPANDING DOCUMENT RETRIEVAL INFORMATION

(75) Inventors: Katsumi Tada, Kawasaki (JP); Naohiro Koizumi, Fujisawa (JP); Hisashi Takatori, Yokohama (JP)

(73) Assignees: Hitachi, Ltd., Tokyo (JP); Hitachi Systems & Services, Ltd., Tokyo (JP)

( * ) Notice: Subject to any disclaimer, the term of this patent is extended or adjusted under 35 U.S.C. 154(b) by 215 days.

(21) Appl. No.: 10/015,800

(22) Filed: Dec. 17, 2001

(65) Prior Publication Data

US 2002/0169763 A1    Nov. 14, 2002

(30) Foreign Application Priority Data

Dec. 19, 2000  (JP) ............................ 2000-389956

(51) Int. Cl.
  G06F 17/30  (2006.01)
  G06F 7/00   (2006.01)

(52) U.S. Cl. .......................................... 707/3
(58) Field of Classification Search .............. 707/3, 707/2, 4, 5; 382/57
  See application file for complete search history.

(56) References Cited

U.S. PATENT DOCUMENTS

| 4,985,863 A | | 1/1991 | Fujisawa et al. |
| 5,048,113 A | * | 9/1991 | Yamagata et al. ........... 382/310 |
| 5,265,242 A | | 11/1993 | Fujisawa et al. |
| 5,469,354 A | * | 11/1995 | Hatakeyama et al. .......... 707/3 |
| 5,581,460 A | * | 12/1996 | Kotake et al. ................. 705/3 |
| 5,581,752 A | * | 12/1996 | Inoue et al. ................ 715/526 |
| 5,628,003 A | | 5/1997 | Fujisawa et al. |
| 5,680,612 A | * | 10/1997 | Asada et al. .................... 707/3 |
| 5,943,443 A | * | 8/1999 | Itonori et al. ............... 382/225 |
| 5,987,460 A | * | 11/1999 | Niwa et al. ..................... 707/6 |
| 5,991,755 A | * | 11/1999 | Noguchi et al. ............... 707/3 |
| 6,041,323 A | * | 3/2000 | Kubota .......................... 707/5 |
| 6,173,253 B1 | * | 1/2001 | Abe et al. ..................... 704/10 |
| 6,473,754 B1 | * | 10/2002 | Matsubayashi et al. ........ 707/5 |

FOREIGN PATENT DOCUMENTS

JP          4-158478        6/1992

* cited by examiner

*Primary Examiner*—Frantz Coby
*Assistant Examiner*—Cindy Nguyen
(74) *Attorney, Agent, or Firm*—Mattingly, Stanger, Malur & Brundidge, P.C.

(57) ABSTRACT

An apparatus for expanding a character string. The character string that is entered to search includes a character string dividing device to divide the entered character string into partial character strings. A referencing device is provided to reference a similarity table. The similarity table stores in advance similar partial character strings, each of the similar partial character strings being derived from each of the partial character strings by changing at least one of the characters of each string to a different character which is similar in shape. An expansion device is provided to combine similar partial character strings into expanded words and store them in table.

20 Claims, 14 Drawing Sheets

FIG. 5

| ENTRY CHARACTER | SIMILARITY TABLE CANDIDATE CHARACTERS |
|---|---|
| 日本 | 日本,日本,日本,日本,日木,日木,日本,日不,日天,日禾 |
| .. | .. |
| 文化 | 文化,文化,文化,文化,大化,文仕,文仕,文仕,文牝,文北 |
| .. | .. |
| 本人 | 本人,木人,木人,不人,天人,末人,本凡,木凡,不凡,天凡,本入,木入,不入,本八 |

500 — ENTRY CHARACTER
501 — SIMILARITY TABLE

FIG. 15

SIMILARITY TABLE

| ENTRY CHARACTERS | CANDIDATE CHARACTERS |
|---|---|
| lo | lo,Io,! o,1o,io,IO,IO,! O,1O,iO,I0,! 0,IQ,IQ,i6 |
| ck | ck,Ck,Gk,ek,qk,cK,CK,GK,eK,ch,Ch,GH,cb,Cb,cR |
| og | og,Og,0g,Qg,6g,o8,O8,08,Q8,oq,Oq,0q,o9,O9,o7 |

METHOD AND SYSTEM FOR EXPANDING DOCUMENT RETRIEVAL INFORMATION

BACKGROUND OF THE INVENTION

The present invention relates to a method of retrieving document information in a system which converts paper documents into electronic documents for storage and management.

JP4158478, U.S. Pat. No. 5,265,242 and U.S. Pat. No. 4,985,863 disclose a character string search method and system.

With the advent of a full-fledged information-oriented society, a document management method based on a document management system that digitizes documents for storage and management has come into wide use, replacing a conventional document management method which files documents in the form of recorded paper and stores and manages them. The early document management method involves generating image data by taking in a paper document by a scanner, registering the image data by associating it with bibliographic information such as "creator," "date of generation" and "keyword" and, for retrieval of a desired document, using the bibliographic information as a subject of search. However, with the search using only the bibliographic information, it is difficult to find the desired document. Because a full text retrieval technique has already been put to practical use that covers an entire document, a document management system with a function of the full text retrieval has come into wide use also in the field of image document.

In this document management system, a document in the form of recorded paper is taken in by a scanner and stored as image data, which is then converted by character-recognition processing into text data. The text data is then stored in addition to the image data. In retrieving a document, the full text retrieval is performed on the text data. When displaying the result of search, the system displays the text data specified or the corresponding image data. The full text retrieval is based on the premise that the subject text data basically has no errors. Since the text data used for the search is generated from image data by character recognition processing using OCR (optical character recognition device), there is a possibility of the text data containing recognition errors. Hence, the search may fail to hit the text data which, if correctly character-recognized, would normally be found.

To solve the above-described problem of a document escaping the search, text data which may contain recognition errors by OCR has conventionally been proofread manually. That is, during the process of registering a document, the text data output from the OCR is compared with the original document to check for recognition errors which are then corrected manually to eliminate errors in the document so that the registered document can be retrieved normally. With this method, however, the manual proofreading and correction work put a heavy burden on the user taking time and labor for the document registration. As a technique to solve this problem, JP4158478 discloses a method that allows for a certain degree of ambiguity of the subject in performing the search. This conventional technique performs a document registration without making any correction to the text data output from the OCR. That is, an error-containing document as obtained from the OCR is registered and some provisions are made in the process of search to eliminate the need for manual correction work.

In the conventional technique which involves dividing a search character string into individual characters, checking the individual characters against a similarity table to pick up candidate characters, and combining the candidate characters for the search characters to form a plurality of character strings (hereinafter referred to as expanded words), when the search character string specified in the document search is long, the number of expanded words that are likely to be erroneously recognized increases dramatically, prolonging the time taken by the search.

For example, when a search character string is "lock" and it is assumed that the search characters have five candidate characters each, such as (l, I, !, 1, i), (o, O, 0, Q, 6), (c, C, G, e, q) and (k, K, h, b, R), then the number of different expanded words generated by combining all of these candidate characters is $5 \times 5 \times 5 \times 5 = 5^4 = 625$.

Similarly, when a search character string is "日" and if it is assumed that the search characters have five candidate characters each, such as (日本文化, 日, 白, 日本文化, 日本文化), (本, 木, 不, 天, 末), (文, 丈, 女, 攵, 大), and (化, 仕, 钜, 比, 北), then the number of different expanded words generated by combining all of these candidate characters is $5 \times 5 \times 5 \times 5 = 5^4 = 625$.

For a longer search character string made up of eight characters, the number of expanded words is as large as $5^8 = 390,625$, indicating that as the character string becomes long, the number of expanded words increases sharply. Because the search operation is based on the full text search using a logical sum (OR) set of the expanded words, an increase in the number of expanded words results in an increase in the search time. Thus, as the search character string becomes long, the time taken by the search also increases significantly.

SUMMARY OF THE INVENTION

An object of the present invention is to realize a document information retrieval method which allows for OCR character recognition errors and enables a search within a practical length of time even when the search character string is long while at the same time reducing a chance of documents escaping the search.

In accordance with the present invention, there is provided with an apparatus for expanding a character string, wherein the character string is entered to search through image information of documents, the apparatus comprising:

a character string dividing device to divide the entered character string into a plurality of partial character strings each having a plurality of characters;

a referencing device to reference a similarity table, the similarity table storing in advance groups of similar partial character strings arranged in the order of magnitude of their emergence probability in each group, each of the groups of similar partial character strings being derived from each of the plurality of partial character strings obtained from the character string dividing device by changing at least one of the characters of each partial character string to a different character which is similar in shape; and an expansion device to combine the plurality of similar partial character strings given by the referencing device into expanded words and store them in an expanded word table in the order of magnitude of a product of emergence probabilities of the similar partial character strings.

In the document retrieval method according to the present invention, for a partial character string consisting of n characters (n≧2), candidate characters that may be erroneously recognized by OCR are listed in an n-character-based similarity table in advance.

First, an operator enters a search character string to be searched that is contained in a target document to be retrieved (step 1500 of FIG. 2). The document search is performed according to a search method which comprises: a search character string dividing step (step 1501) of dividing the entered search character string into partial character strings each consisting of a predetermined number n of characters (n≧2); an n-character-based similarity table referencing step (step 1502) of checking each of the divided partial character strings against the n-character-based similarity table and extracting candidate character strings likely to contribute to improving the search accuracy; a search character string expanding step (step 1503) of generating expanded words by combining the extracted candidate character strings for the partial character strings; a search condition equation generating step (step 1504) of generating a search condition equation to find a document containing any of the expanded words; and a search condition input step (step 1505) of entering the search condition equation into a text search program.

Taking advantage of the characteristic fact that "a candidate character string made up of a combination of those characters which are unlikely to be erroneously recognized in single characters has a low probability of contributing to improving the search accuracy," this method arranges the candidate character strings in the similarity table to have n characters each and eliminates those candidate n-character strings not contributing to precision improvement to reduce the number of candidates.

BRIEF DESCRIPTION OF THE DRAWINGS

FIG. 5 is an example of the similarity table in the first embodiment.

FIG. 15 is an example of the similarity table in the first embodiment.

DESCRIPTION OF THE EMBODIMENTS

Figure 1:
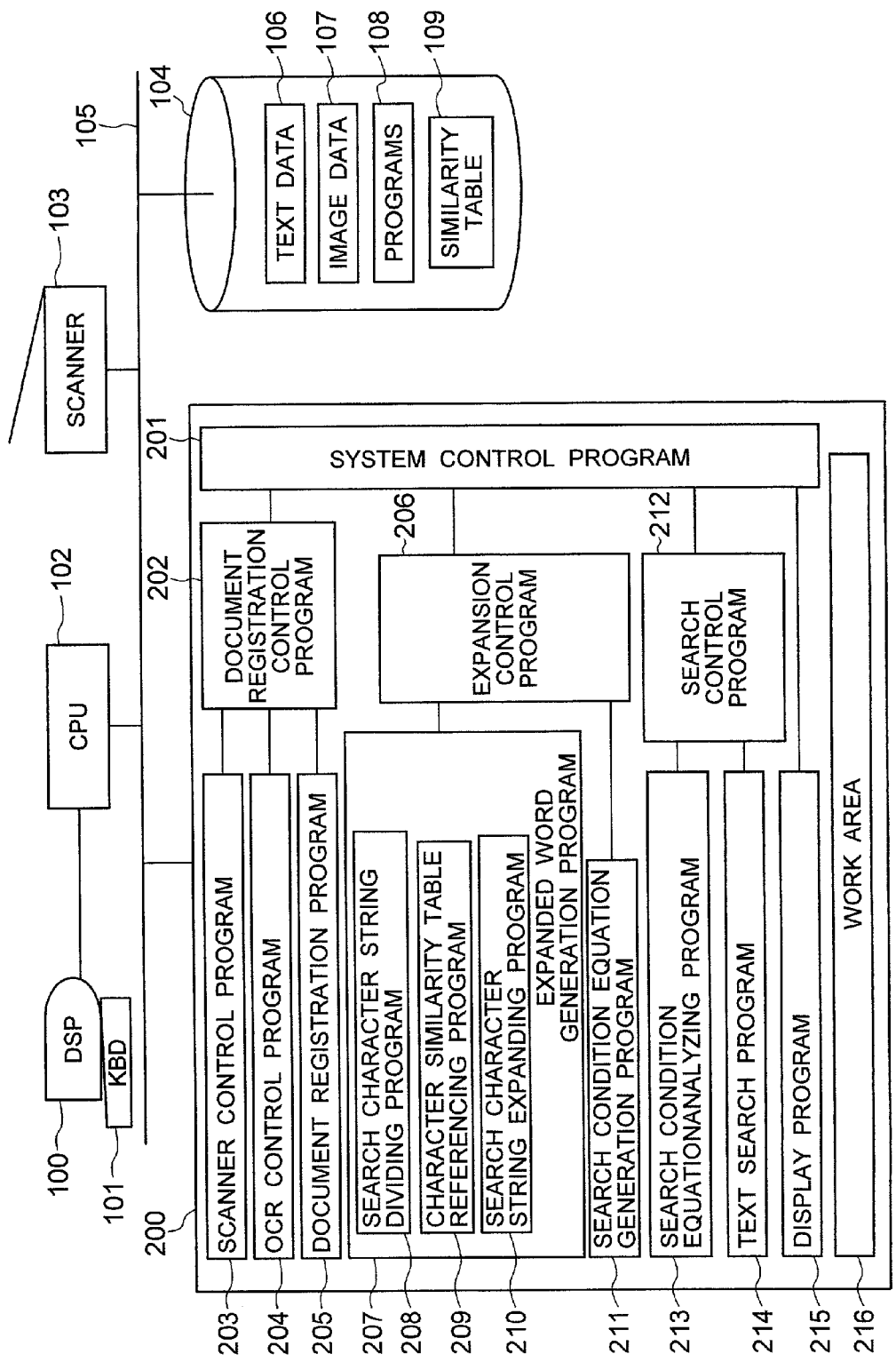
FIG. 1 is a configuration diagram of a document retrieval system according to a first embodiment.
Figure 2:
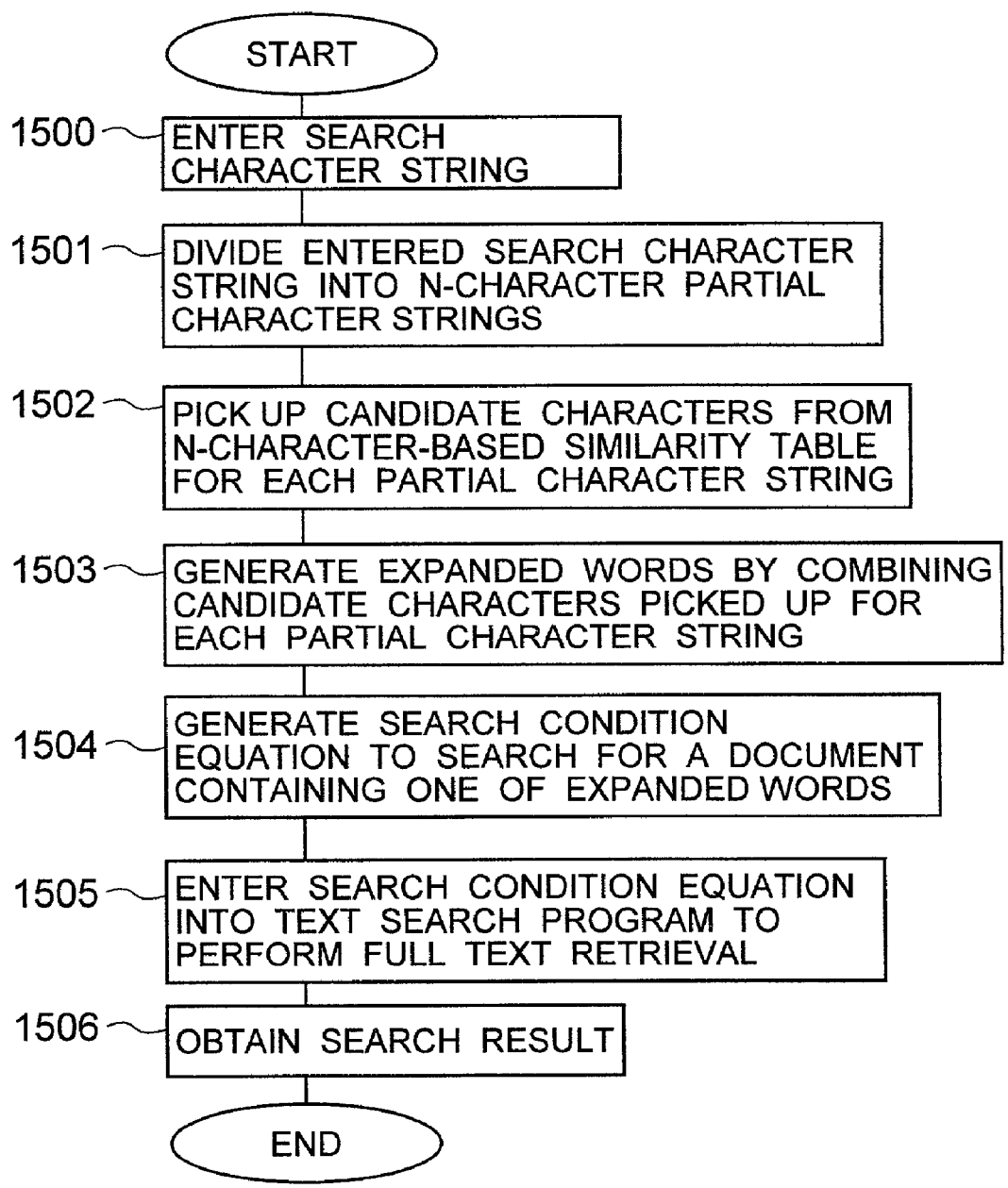
FIG. 2 is a flow chart showing a search method of the present invention.

Now, a first embodiment of this invention will be described by referring the accompanying drawings. First, a configuration of the document retrieval system applying the present invention is shown in FIG. 1. This document retrieval system comprises a display 100, a keyboard 101, a central processing unit CPU 102, a scanner 103, a main memory 200, and a magnetic disk 104. These are interconnected by a bus 105. The magnetic disk 104 stores text data 106, image data 107, various programs 108 described later, and a similarity table 109.

The main memory 200 has stored therein a system control program 201, a document registration control program 202, a scanner control program 203, an OCR control program 204, a document registration program 205, a expansion control program 206, a expanded word generation program 207, a search condition equation generation program 211, a search control program 212, a search condition equation analyzing program 213, a text search program 214, and a display program 215, all read out from the magnetic disk 104. The main memory 200 also has a work area 216.

The expanded word generation program 207 comprises a search character string dividing program 208, a similarity table referencing program 209, and a search character string expanding program 210. These programs are executed under the control of the system control program 201 according to a specification entered from the keyboard 101 of the user. Described above is the configuration of this document management system.

Next, the similarity table 109 will be explained. Generally, the table lists n-character candidate characters strings. In this embodiment, we take n=2 for example.

Figure 3:
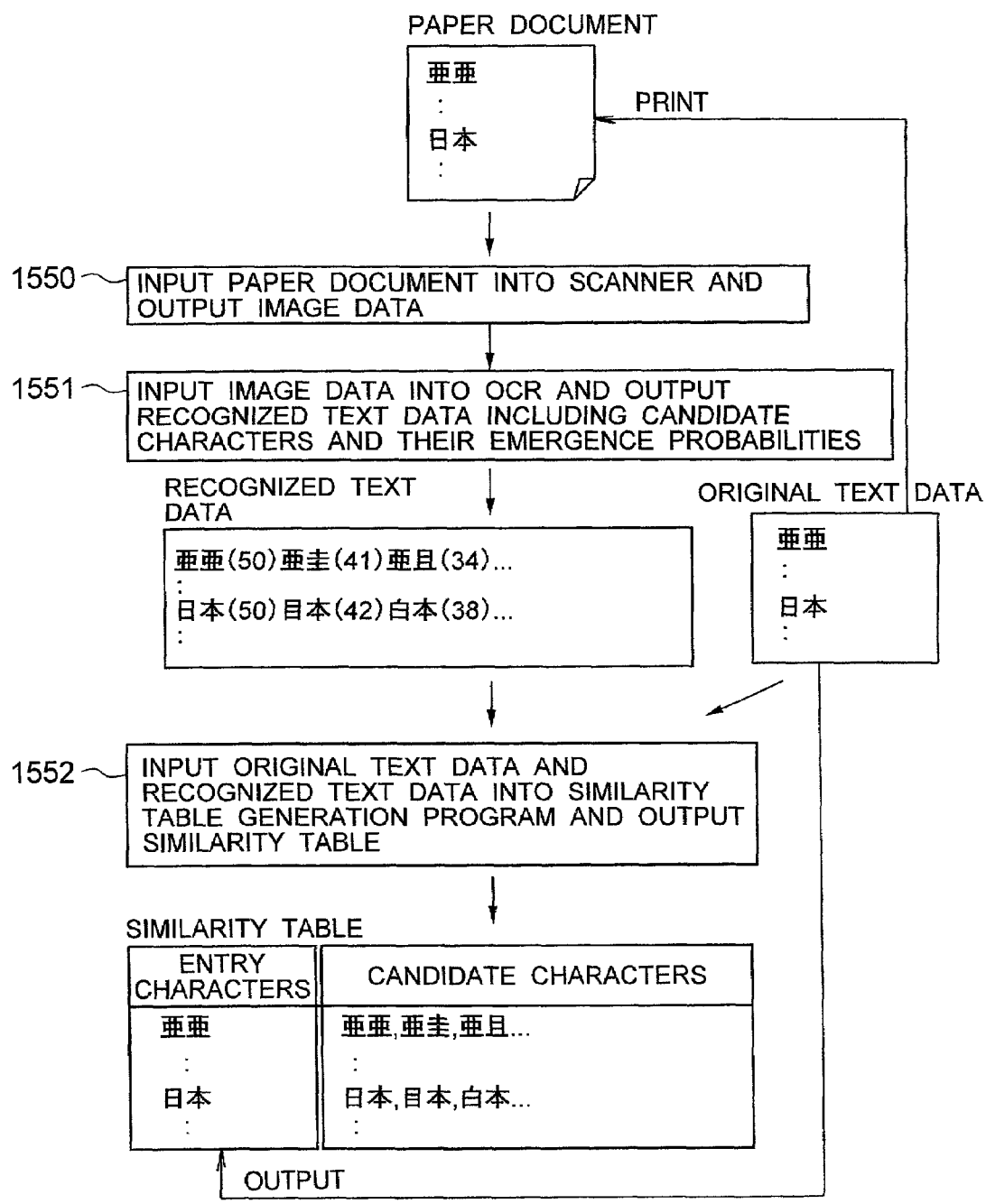
FIG. 3 is an outline illustrating a process of generating a similarity table in the first embodiment.

The OCR normally recognizes characters based on the features of their shapes and thus cannot always produce correct recognition results. Hence, in addition to finalized characters, the table also lists other candidate characters that have some probability of recognition. To ensure that the expansion process generates all possible candidate words, this similarity table is realized by collecting candidate characters output by the OCR using 2-character learning data that combines all character codes, along with information on probability (hereinafter referred to as an emergence probability) at which each of the candidate characters may be erroneously recognized. FIG. 3 shows an outline of how the similarity table is generated. First, 2-character learning data combining all character codes is printed on paper and the printed paper document is entered into the scanner which outputs image data (step 1550). Next, the image data is entered into the OCR which outputs recognized text data listing candidate characters and their emergence probabilities (step 1551). Then, the original text data as the learning data and the recognized text data described above are input into a similarity table generation program to generate the similarity table (step 1552).

Figure 4:
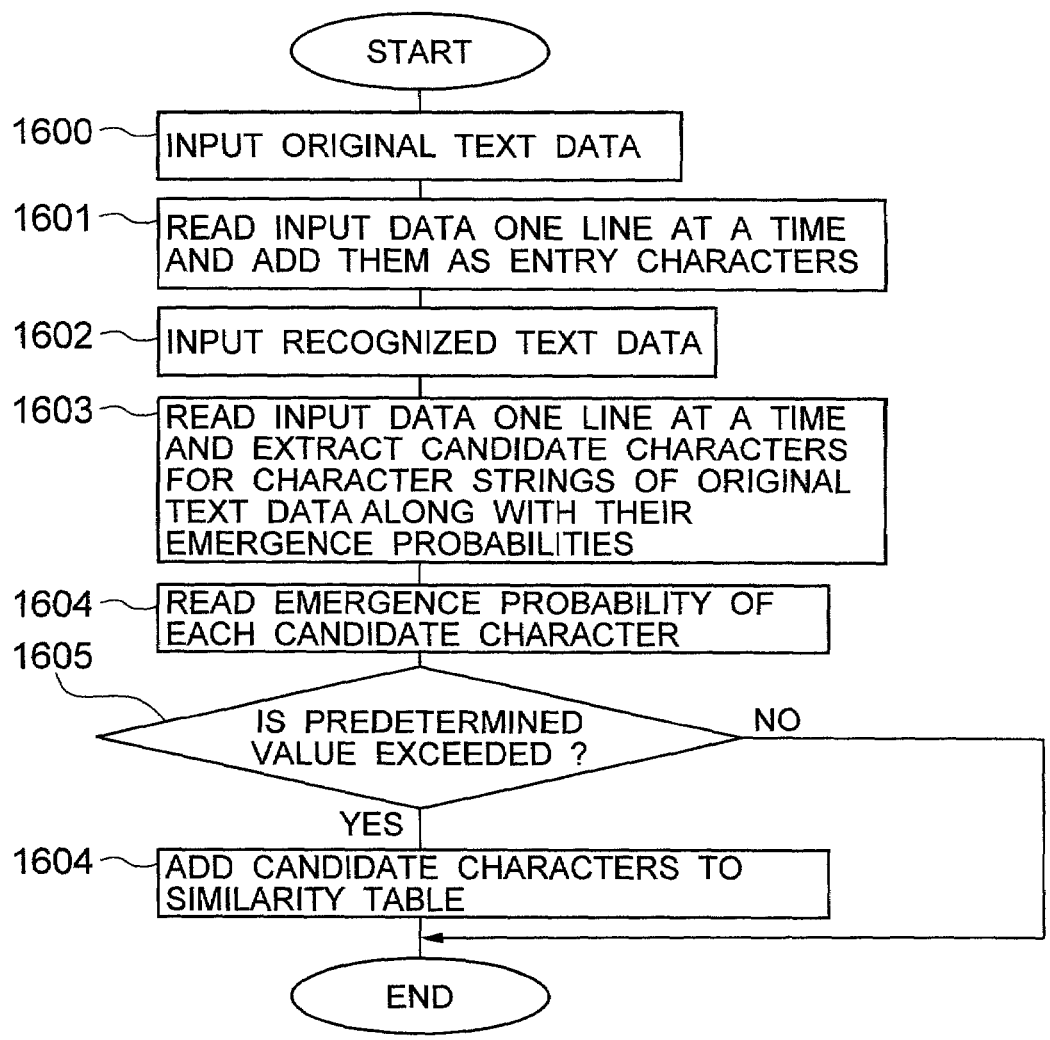
FIG. 4 is a flow chart showing a procedure for generating the similarity table in the first embodiment.

Next, a detailed procedure of the similarity table generation program is illustrated in a flow chart of FIG. 4. First, original text data as the learning data is entered (step 1600). The original text data is read one line at a time and added as entry characters to the similarity table (step 1601). Next, the recognized text data is entered (step 1602) and, for each line entered, candidate characters are extracted along with their emergence probabilities (step 1603). Next, those candidate characters having the emergence probabilities in excess of a predetermined value are added to the similarity table (step 1604–1606), thus generating the similarity table. At this time, only the candidate characters with their emergence probabilities in excess of a predetermined value are extracted and listed on the similarity table, eliminating those candidate characters making no contributions to an improved search accuracy to drastically reduce the number of candidate characters. Although the above example uses as the probability information the emergence probability based on the OCR output, the probability information may be frequency information based on the result of learning obtained after the OCR has performed character recognition on the similar learning data a plurality of times. FIG. 5 shows an example similarity table, with one vertical column representing entry characters (500) and another column shown to the right representing candidate characters (501) for which the entry characters may be wrongly recognized.

Now, candidate character strings for "lock", (l, I, !, 1, i), (o, O, 0, Q, 6), (c, C, G, e, q), (k, K, h, b, R), will be discussed here.

Figure 14:
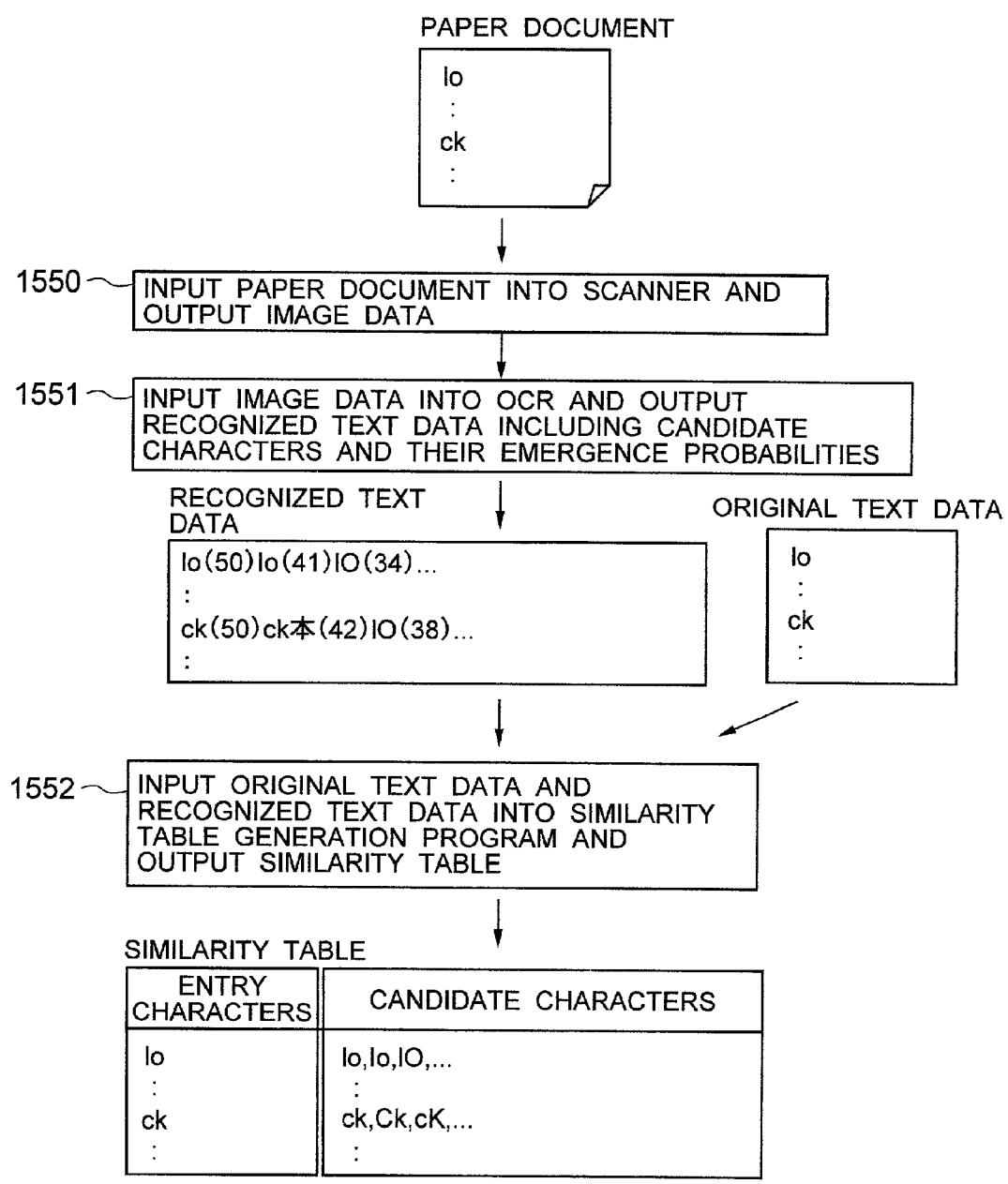
FIG. 14 is an outline illustrating a process of generating a similarity table in the first embodiment.

A case of a character string "lo" will be explained by referring to FIG. 14. The conventional technique generates 5×5=25 expanded words shown below by combining sets of all candidate characters (l, I, !, 1, i) and (o, O, 0, Q, 6) picked up for each character of the word "lo", these candidate characters in each set being arranged in the order in which they are more likely to be erroneously recognized:

(lo, Io, !o, 1o, io,
IO, IO, !O, 1O, iO,
l0, I0, !0, 10, i0,
lQ, IQ, !Q, 1Q, iQ,
l6, I6, !6, 16, i6)

And the logical sum set of these expanded words are used as the search condition. However, the expanded word "i6" which is a combination of the fifth candidate character and the fifth candidate character is considered to have a very low possibility of contributing to the improvement of the search accuracy. Thus, by taking advantage of the characteristic fact that "a combination of candidate characters that have low emergence probabilities in single characters results in a further reduction in their emergence probabilities," those candidate characters making no contributions to the improvement of the search accuracy can be eliminated. Thus, the expanded words for the word "lo" may be (lo, Io, !o, 1o, io,
IO, IO, !O, 1O,
l0, I0, !0,
lQ, IQ,
l6)

as shown in FIG. 15. The search accuracy of the search that is made using 15 expanded words listed above is hardly degraded when compared with that of the search using 25 expanded words generated from all combinations of candidate characters. The reason for this will be explained in the following example.

For each of the characters "l" and "o", it is assumed that the first candidate character has an emergence probability of $\frac{1}{2}$, second candidate character has $\frac{1}{4}$, third candidate character has $\frac{1}{8}$, fourth candidate character has $\frac{1}{16}$, fifth candidate character has $\frac{1}{32}$, and subsequent candidate characters have $\frac{1}{32}$. Then, combining the candidate characters and calculating the multiplied emergence probabilities results in:
"lo" $\frac{1}{4}$, "Io" $\frac{1}{8}$, "!o" $\frac{1}{16}$, "1o" $\frac{1}{32}$, "io" $\frac{1}{64}$,
"lO" $\frac{1}{8}$, "IO" $\frac{1}{16}$, "!O" $\frac{1}{32}$, "1O" $\frac{1}{64}$, "iO" $\frac{1}{128}$,
"l0" $\frac{1}{16}$, "I0" $\frac{1}{32}$, "!0" $\frac{1}{64}$, "10" $\frac{1}{128}$, "i0" $\frac{1}{256}$,
"lQ" $\frac{1}{32}$, "IQ" $\frac{1}{64}$, "!Q" $\frac{1}{128}$, "1Q" $\frac{1}{256}$, "iQ" $\frac{1}{512}$,
"l6" $\frac{1}{64}$, "I6" $\frac{1}{128}$, "!6" $\frac{1}{256}$, "16" $\frac{1}{512}$, "i6" $\frac{1}{1,024}$ By adopting the character strings in the upper left half of these expanded words, it is possible with a probability of $\frac{1}{4}+\frac{1}{8}\times2+\frac{1}{16}\times3+\frac{1}{32}\times4+\frac{1}{64}\times5=\frac{57}{64}\approx90\%$ to prevent the words from escaping the search. Hence, removing the candidate characters with low emergence probabilities from the search has almost no adverse effects on the search precision.

Next, the effect of arranging the candidate characters in the form of n-character strings will be explained by taking a word "日本" as an example. There is no need to generate all of the 5×5=25 expanded words shown below and use a logical sum set of these expanded words as a search condition in the search operation. The 25 expanded words are generated by combining sets of all candidate characters (日本文化, 日, 白, 日本文化, 日本文化) and (本, 木, 不, 天, 末) picked up for each character of the word "日本", these candidate characters in each set being arranged in the order in which they are more likely to be erroneously recognized: (日本, 日本, 白本, 日本, 白本, 日木, 日木, 白木, 日木, 日木, 白木, 日不, 日不, 白不, 日不, 臼不, 日天, 日天, 白天, 日天, 白天, 日末, 日末, 白末, 日末, 白末)

The expanded word "白末" which is a combination of the fifth candidate character in the first set and the fifth candidate character in the second set is considered to have a very low possibility of contributing to the improvement of the search accuracy. Thus, by taking advantage of the characteristic fact that "a combination of two candidate characters each of which has a low emergence probability in a single character results in a further reduction in their emergence probabilities," those candidate characters making no contributions to the improvement of the search accuracy can be eliminated. Thus, the expanded words for the word "日本" may be (日本, 日本, 白本, 日本, 臼本, 日木, 日木, 白木, 日木, 日不, 日不, 白不, 日天, 日天, 日末)

as shown in FIG. 5. The search accuracy of the search that is made using 15 expanded words listed above is hardly degraded when compared with that of the search using 25 expanded words generated from all combinations of candidate characters. The reason for this will be explained in the following example.

For each of the characters "日本文化" and "本", it is assumed that the first candidate character has an emergence probability of $\frac{1}{2}$, second candidate character has $\frac{1}{4}$, third candidate character has $\frac{1}{8}$, fourth candidate character has $\frac{1}{16}$, fifth candidate character has $\frac{1}{32}$, and subsequent candidate characters have $\frac{1}{32}$. Then, combining the candidate characters and calculating the multiplied emergence probabilities results in:

"日本" $\frac{1}{4}$, "日本" $\frac{1}{8}$, "白本" $\frac{1}{16}$, "日本" $\frac{1}{32}$, "臼本" $\frac{1}{64}$, "日木" $\frac{1}{8}$, "日木" $\frac{1}{16}$, "白木" $\frac{1}{32}$, "日木" $\frac{1}{64}$, "白木" $\frac{1}{128}$, "日不" $\frac{1}{16}$, "日不" $\frac{1}{32}$, "白不" $\frac{1}{64}$, "日不" $\frac{1}{128}$, "日不" $\frac{1}{256}$, "日天" $\frac{1}{32}$, "日天" $\frac{1}{64}$, "白天" $\frac{1}{128}$, "日天" $\frac{1}{256}$, "日天" $\frac{1}{512}$, "日末" $\frac{1}{64}$, "日末" $\frac{1}{128}$, "白末" $\frac{1}{256}$, "日末" $\frac{1}{512}$, "白末" $\frac{1}{1024}$ By adopting the character strings in the upper left half of these expanded words, it is possible with a probability of $\frac{1}{4}+\frac{1}{8}\times2+\frac{1}{16}\times3+\frac{1}{32}\times4+\frac{1}{64}\times5=\frac{57}{64}\approx90\%$ to prevent the words from escaping the search. Hence, removing the candidate characters with low emergence probabilities from the search has almost no adverse effects on the search precision.

An example similarity table generated as described above is shown in FIG. 15.

By selecting candidate characters based on the emergence probabilities of n-character strings, it is possible to narrow the candidate characters in the similarity table down to only those with high emergence probabilities. This can reduce the number of candidate characters contributing to the improvement of search accuracy. When character strings contain less than n characters, it is possible to generate an m-character-based similarity table (m<n) so that candidate m-character strings can be picked up for generating the expanded words. Described above is the explanation about the similarity table 109.

Figure 6:
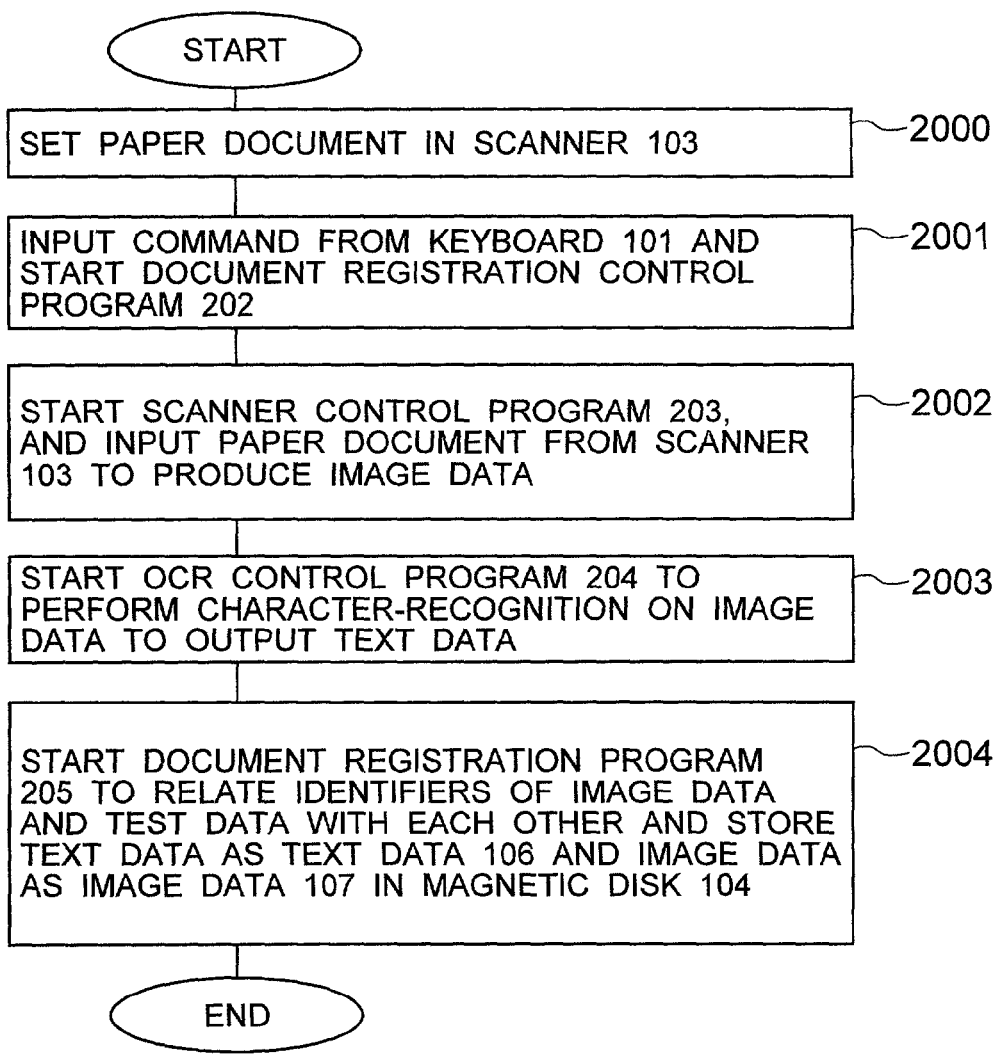
FIG. 6 is a flow chart showing a document registration procedure in the first embodiment.

Now, registration processing in the document retrieval system will be described by referring to FIG. 6.

In registering a document, a paper document to be registered is set in the scanner 103 (step 2000). The system control program 201 accepts a command from the keyboard 101 to start the document registration control program 202 (step 2001). The document registration control program 202 first starts the scanner control program 203 to extract image data from the paper document set in the scanner 103 and outputs it to the work area 216 (step 2002). Next, the document registration control program 202 starts the OCR control program 204 to perform character-recognition using the image data in the work area 216 as an input, extract text data and output it to the work area 216 (step 2003). Finally the document registration control program 202 starts the document registration program 205 to associate with each other identifiers of the text data and the image data, both read into the work area 216. Index data for use in the search operation is generated from the text data. Then, the text data and the image data are stored as text data 106 and image data 107, respectively, in the magnetic disk 104 (step 2004). This embodiment may be applied to not only the configuration where image data is taken in from a paper document by the scanner but also a configuration where image data is input directly from a facsimile via communication lines. This is the registration processing in the document retrieval system.

Figure 7:
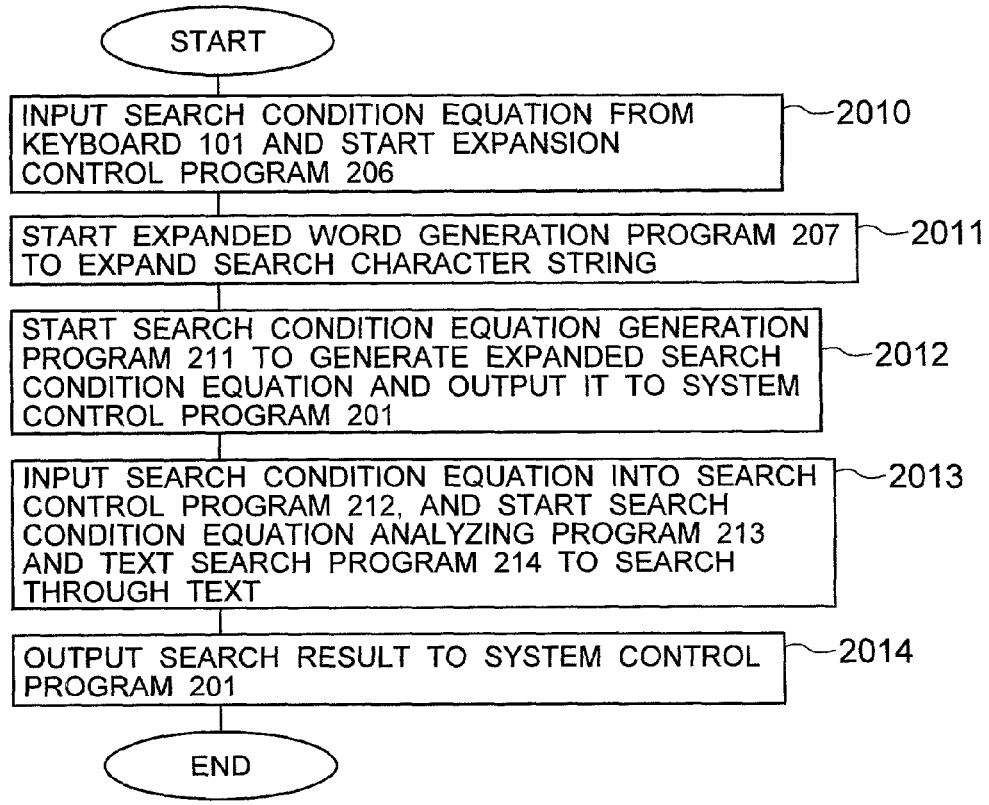
FIG. 7 is a flow chart showing a search procedure in the first embodiment.

Next, the search processing in the document retrieval system will be explained by referring to FIG. 7.

In the search operation, when a search condition equation is entered from the keyboard 101, the system control program 201 starts the expansion control program 206 (step 2010). Next, the expansion control program 206 activates the expanded word generation program 207 to generate a plurality of expanded words for the input search character string and outputs them to the work area 216 (step 2011). Next, the expansion control program 206 starts the search condition equation generation program 211 to expand the expanded words into a search condition equation, which represents a logical sum (OR) set of the expanded words read into the work area 216, and output the search condition equation to the system control program 201 (step 2012).

Next, the system control program 201 starts the search control program 212 which takes in the search condition equation. Then this control program successively starts the search condition equation analyzing program 213 and the text search program 214 to perform a text search according to the search condition equation (step 2013). As a final step, the result of search is output to the system control program 201 (step 2014). The system of this invention may comprise, as shown in FIG. 1, an expanded word generation program (208–210), a work area 216 in which to store the expanded words, a similarity table 109, a CPU 102, and other programs 108. This is because the search operations at and following the step 2013 may be executed by a separate device.

Figure 8:
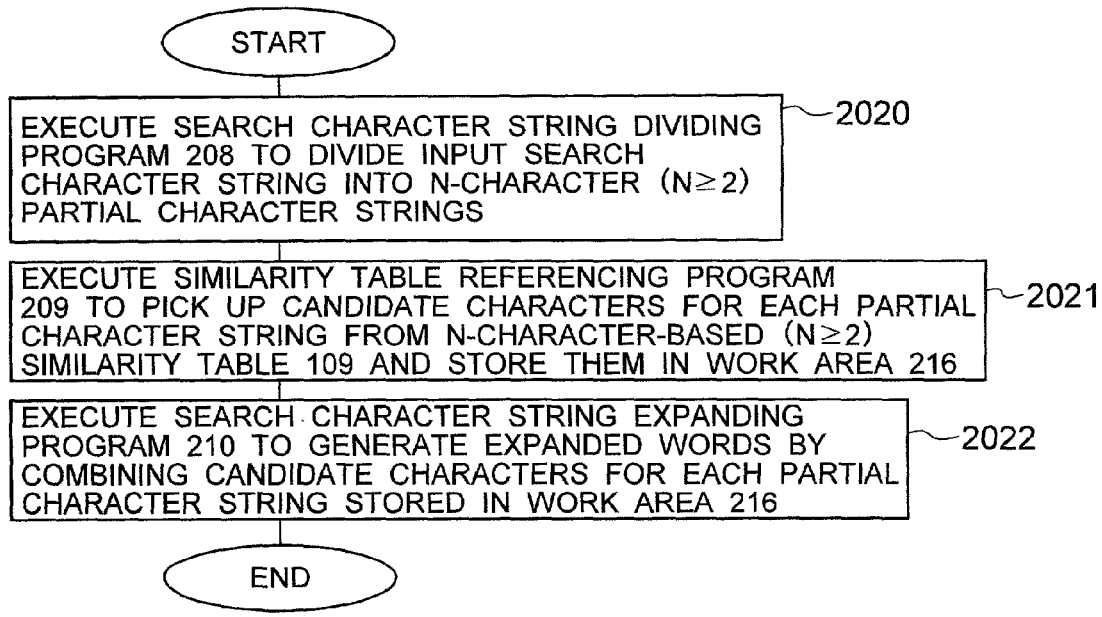
FIG. 8 is a flow chart showing a expanded word generation procedure in the first embodiment.

Next, detailed procedure of the expanded word generation program 207 will be explained by referring to FIG. 8. The expanded word generation program 207 starts the search character string dividing program 208 to divide the entered search character string into n-character (n≧2) partial search strings (step 2020). Then, the similarity table referencing program 209 is executed to reference candidate characters in the n-character-based (n≧2) similarity table 109 described above for each of the divided partial character strings and store the candidate characters in the work area 216 (step 2021). Next, the search character string expanding program 210 is executed to read out the candidate characters for each of the partial character strings from the work area 216 and combine them to generate a plurality of expanded words (step 2022). This is the procedure performed by the expanded word generation program 207 in the document retrieval system.

What has been described above concerns the search processing in the document retrieval system.

Figure 9:
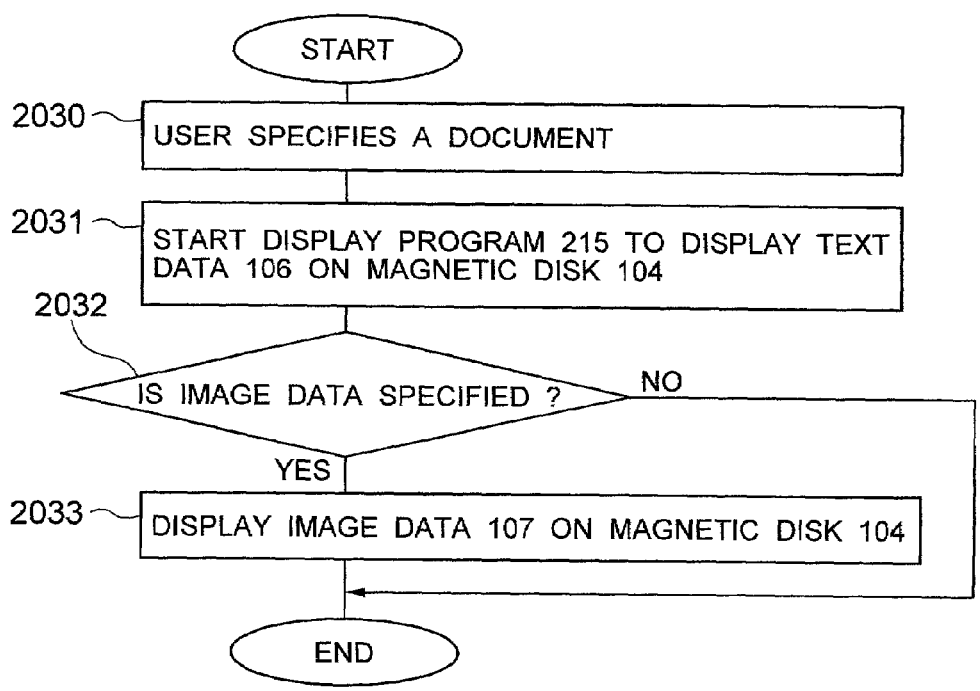
FIG. 9 is a flow chart showing a document display procedure in the first embodiment.

Now, document display processing in this document retrieval system will be described by referring to FIG. 9.

When displaying a user-specified document from the search result, the user specifies a document he or she wants displayed (step 2030). Then, the system control program 201 starts the display program 215 which displays the text data 106 stored in the magnetic disk 104 (step 2031). At this time it is checked whether the display of the image data is specified (step 2032) and, if so, the associated image data 107 in the magnetic disk 104 is displayed (step 2033).

The search method described above will be detailed in the following by taking "日" as an example search character string. In this example, the word expansion is based on 2-character strings and candidate words for "日本" and "文化" are looked up in the similarity table of FIG. 6.

When a search character string "日" is entered, the expanded word generation processing is first initiated. In the expanded word generation, the search character string "日" is divided into 2-character partial character strings "日本" and "文化". Next, the candidate characters for "日本" are looked up in the similarity table and (日本, 目本, 白本, 日本, 白本, 日木, 目木, 白木, 日木, 日不, 目不, 白不, 日天, 目天, 日末) are read into the work area. Similarly, the candidate characters for "文化" (文化, 丈化, 女化, 攵化, 大化, 文仕, 丈仕, 女仕, 攵仕, 文牝, 丈牝, 女牝,文比, 丈比, 文北are read into the work area. Next, these candidate characters for the partial character strings are combined to generate expanded words as shown in Table 1.

TABLE 1

| |
|---|
| " 日末文化 " |
| " 日本丈化 " |
| " 日本女化 " |
| " 日本文化 " |
| " 日本大化 " |
| ... |
| " 日末文北 " |

Performing the search according to the logical sum (OR) condition that includes any one of the expanded words shown above ("日" or "日本丈化" or "日本女化" or "日本攵化" or "日本大化" or ... or "日末文北") can reduce the possibility of the search character string eluding the search. In the case of such a long search character string, the word expansion is based on the partial character strings of a predetermined length and candidate characters with low emergence probabilities are excluded from the similarity table. This procedure results in a search using 15×15=225 expanded words as opposed to 5×5×5×5=625 expanded words used in the conventional search method. That is, the expanded words generated by using the similarity table containing only the candidate characters with high emergence probabilities can be made substantially smaller in number than those which are generated by combining all candidate characters as in the conventional technique, while maintaining the search precision. This in turn allows a significant reduction in the search time.

As described above, this embodiment generates a 2-character-based similarity table. Hence, when the search character string or search term is made up of an even number of characters, it is possible to divide the search term into two-character strings, refer to the similarity table and combine candidate character strings to generate expanded words.

Next, example processing for a case where the search term consists of an odd number of characters (three or more characters) will be explained.

When the search term is made up of an odd number of characters (three or more characters), the search term is divided into a character string of the first three characters and a remaining character string consisting of a fourth and subsequent characters (even number of characters).

Then, the first three characters are divided into a two-character string made up of the first and the second character and a two-character string made up of the second and the third character. The character string of the fourth and the remaining characters is divided into 2-character strings. These divided character strings are checked against the similarity table.

The expansion processing for the fourth and the subsequent characters is similar to that described in the previous case of "日" and thus its explanation is omitted. Here, an example of expansion for a three-character search term of "日本人" will be described.

First, the 3-character search term "日本人" is divided into a 2-character string "日本" made up of the first and the second character and a 2-character string "本人" made up of the second and the third character.

Then, by referring to the similarity table shown in FIG. 5, candidate character strings for "日本" are extracted, which are "日本", "目本", "白本", "囗本", "日木", "日朩", "白木", "日木", "日不", "目不", "白不", "日天", "目天", "日未".

For "本人", candidate characters "本人", "朩人", "不人", "天人", "未人", "本ん", "木ん", "不ん", "天ん", "本メ", "木メ", "不メ", "本入", "木入", "本ハ" are extracted.

As a final step, among the candidate character strings expanded from "日本", those whose second character matches the first character of "本人" are picked up. Among the candidate character strings expanded from "本人", those whose first character matches the second character of "日本" are picked up. These two sets of extracted candidate character strings are combined to generate expanded words for the 3-character string "日本人".

More specifically, those candidate character strings for "日本" whose second character is "本" are "日本", "目本", "白本", "囗本" and "日本". Those candidate character strings for "本人" whose first character is "本" are "本人", "本ん", "本メ", "本入" and "本ハ". Combining these two candidate sets results in 25 expanded words.

Similarly, those candidate character strings for "日本" whose second character is "木" are "日木", "目木", "白木" and "日木". Those candidate character strings for "本人" whose first character is "木" are "木人", "木ん", "木メ" and "木入". Combining these two candidate sets results in 16 expanded words.

Further, those candidate character strings for "日本" whose second character is "不" are "日不", "目不", and "白不". Those candidate character strings for "本人" whose first character is "不" are "不人", "不ん" and "不メ". Combining these two candidate sets results in nine expanded words.

Further, those candidate character strings for "日本" whose second character is "天" are "日天" and "目天". Those candidate character strings for "本人" whose first character is are "天" are "天人" and "天ん". Combining these two candidate sets results in four expanded words.

As a final step, those candidate character strings for "日本" whose second character is "未" are "日未. Those candidate character strings for "本人" whose first character is "未" are "未人". Combining these two candidate sets results in one expanded word.

It is seen from the above that the expanded words for the 3-character search term "日本人" that are generated by this embodiment are reduced in number to 25+16+9+4+1=55 from 5×5×5=125 generated by the conventional method.

While in the above example the detailed processing flow has been described for the 3-character search term "日本人", it is also possible in the case of a 5-character search term to use 2-character expanded words for a character string of the last two characters in combination with the 3-character expanded words described above. Further, it is obvious that for search terms consisting of an odd number of characters equal to or larger than seven, the similar processing can be used to reduce the number of expanded words.

Further, in the search method described above, let us consider another case where "lock" is used as a search character string. In this example, the word expansion is based on 2-character strings and candidate characters for "lo" and "ck" are looked up in the similarity table of FIG. 15.

When a search character string "lock" is entered, the expanded word generation processing is first carried out. In the expanded word generation, the search character string "lock" is divided into 2-character partial character strings "lo" and "ck". Next, the candidate characters for "lo" are looked up in the similarity table and (lo, Io, !o, 1o, io, lO, IO, !O, 1O, l0, I0, !0, lQ, IQ, 16) are read into the work area. Similarly, the candidate characters for "ck" (ck, Ck, Gk, ek, qk, cK, CK, GK, eK, ch, Ch, GH, cb, Cb, cR) are read into the work area. Next, these candidate characters for the partial character strings are combined to generate expanded words shown in Table 2.

TABLE 2

"lock"
"loCk"
"loGk"
"loek"
"loqk"
. . .
"16cR"

Performing the search according to the logical sum (OR) condition that includes any one of the expanded words shown above ("lock" or "loCk" or "loGk" or "loek" or "loqk" or . . . or "16cR") can reduce the possibility of the search character string eluding the search. In the case of such a long search character string, the word expansion is based on the partial character strings of a predetermined length and candidate characters with low emergence probabilities are excluded from the similarity table. This procedure results in a search using 15×15=225 expanded words as opposed to 5×5×5×5=625 expanded words used in the conventional search method. That is, the expanded words generated by using the similarity table containing only the candidate characters with high emergence probabilities can be made substantially smaller in number than those which are generated by combining all candidate characters as in the conventional technique, while maintaining the search precision. This in turn allows a significant reduction in the search time.

As described above, this embodiment generates a 2-character-based similarity table. Hence, when the search character string or search term is made up of an even number of characters, it is possible to divide the search term into two-character strings, refer to the similarity table and combine candidate character strings to generate expanded words.

Next, example processing for a case where the search term consists of an odd number of characters (three or more characters) will be explained.

When the search term is made up of an odd number of characters (three or more characters), the search term is divided into a character string of the first three characters and a remaining character string consisting of the fourth and subsequent characters (even number of characters).

Then, the first three characters are divided into a two-character string made up of the first and the second character and a two-character string made up of the second and the third character. The character string of the fourth and the remaining characters is divided into 2-character strings. These divided character strings are checked against the similarity table.

The expansion processing for the fourth and the subsequent characters is similar to that described in the previous case of "lock" and thus its explanation is omitted. Here, an example of expansion for a three-character search term of "log" will be described.

First, the 3-character search term "log" is divided into a 2-character string "lo" made up of the first and the second character and a 2-character string "og" made up of the second and the third character.

Then, by referring to the similarity table shown in FIG. 15, candidate character strings for "lo" are extracted, which are "lo", "Io", "!o", "1o", "io", "lO", "IO", "!O", "1O", "l0", "I0", "!0", "lQ", "IQ", "16".

For "og", candidate characters "og", "Og", "0g", "Qg", "6g", "o8", "O8", "08", "Q8", "oq", "Oq", "0q", "o9", "O9", "o7" are extracted.

As a final step, among the candidate character strings expanded from "lo", those whose second character matches the first character of "og" are picked up. Among the candidate character strings expanded from "og", those whose first character matches the second character of "lo" are picked up. These two sets of extracted candidate character strings are combined to generate expanded words for the 3-character string "log".

More specifically, those candidate character strings for "lo" whose second character is "o" are "lo", "Io", "!o", "1o" and "io". Those candidate character strings for "og" whose first character is "o" are "og", "o8", "oq", "o9" and "o7". Combining these two candidate sets results in 25 expanded words.

Similarly, those candidate character strings for "lo" whose second character is "O" are "lO", "IO", "!O" and "1O". Those candidate character strings for "og" whose first character is "O" are "Og", "O8", "Oq" and "O9". Combining these two candidate sets results in 16 expanded words.

Further, those candidate character strings for "lo" whose second character is "0" are "l0", "I0" and "!0". Those candidate character strings for "og" whose first character is "0" are "0g", "08" and "0q". Combining these two candidate sets results in nine expanded words.

Further, those candidate character strings for "lo" whose second character is "Q" are "lQ" and "IQ". Those candidate character strings for "og" whose first character is "Q" are "Qg" and "Q8". Combining these two candidate sets results in four expanded words.

As a final step, those candidate character strings for "lo" whose second character is "6" are "l6. Those candidate character strings for "og" whose first character is "6" are "6g". Combining these two candidate sets results in one expanded word.

It is seen from the above that the expanded words for the 3-character search term "log" that are generated by this embodiment are reduced in number to 25+16+9+4+1=55 from 5×5×5=125 generated by the conventional method.

While in the above example the detailed processing flow has been described for the 3-character search term "log", it is also possible in the case of a 5-character search term to use 2-character expanded words for a character string of the last two characters in combination with the 3-character expanded words described above. Further, it is obvious that for search terms consisting of an odd number of characters equal to or larger than seven, the similar processing can be used to reduce the number of expanded words.

Although the process of generating a similarity table shown in FIG. 3 uses 2-character learning data that combines all character codes, it is also possible to use as the learning data 2-character strings that combine those character codes having high frequencies of use. In that case, for a 2-character string not included in the similarity table, the search character string itself can be used as a candidate character string for expansion.

The first embodiment has been described above. In the search allowing for OCR recognition errors, this embodiment can reduce the possibility of the search character string escaping the search and realize a high-precision search in a practical search time.

Next, a second embodiment of the present invention will be described.

In the first embodiment, the n-character-based similarity table is checked and those character strings with low probability of contributing to the improvement of the search accuracy are removed from the word expansion. This realizes a fast search even when the search character string is long. With this method, however, when the search character string specified in the document search is short, expanding the character string into candidate words for which the character string is likely to be mistaken and then performing a search using the expanded words can increase undesired results (hereinafter referred to as search noise). For example, in the case of a search character string of "大", expanding this search character string into a logical sum set of ("大" or "尢" or "太" or "木"...) and performing a search using this set will produce a search result that includes those documents which contain such expanded words of different meanings as "太" and "木". Hence, the search noise increases, degrading the search accuracy.

In addition to the processing done by the first embodiment, the second embodiment has a step of checking whether or not the word expansion is done in the length of the entered search character string and switching between different expansion methods according to the check result. This arrangement offers the effect of reducing the search noise when the search character string is short.

Figure 10:
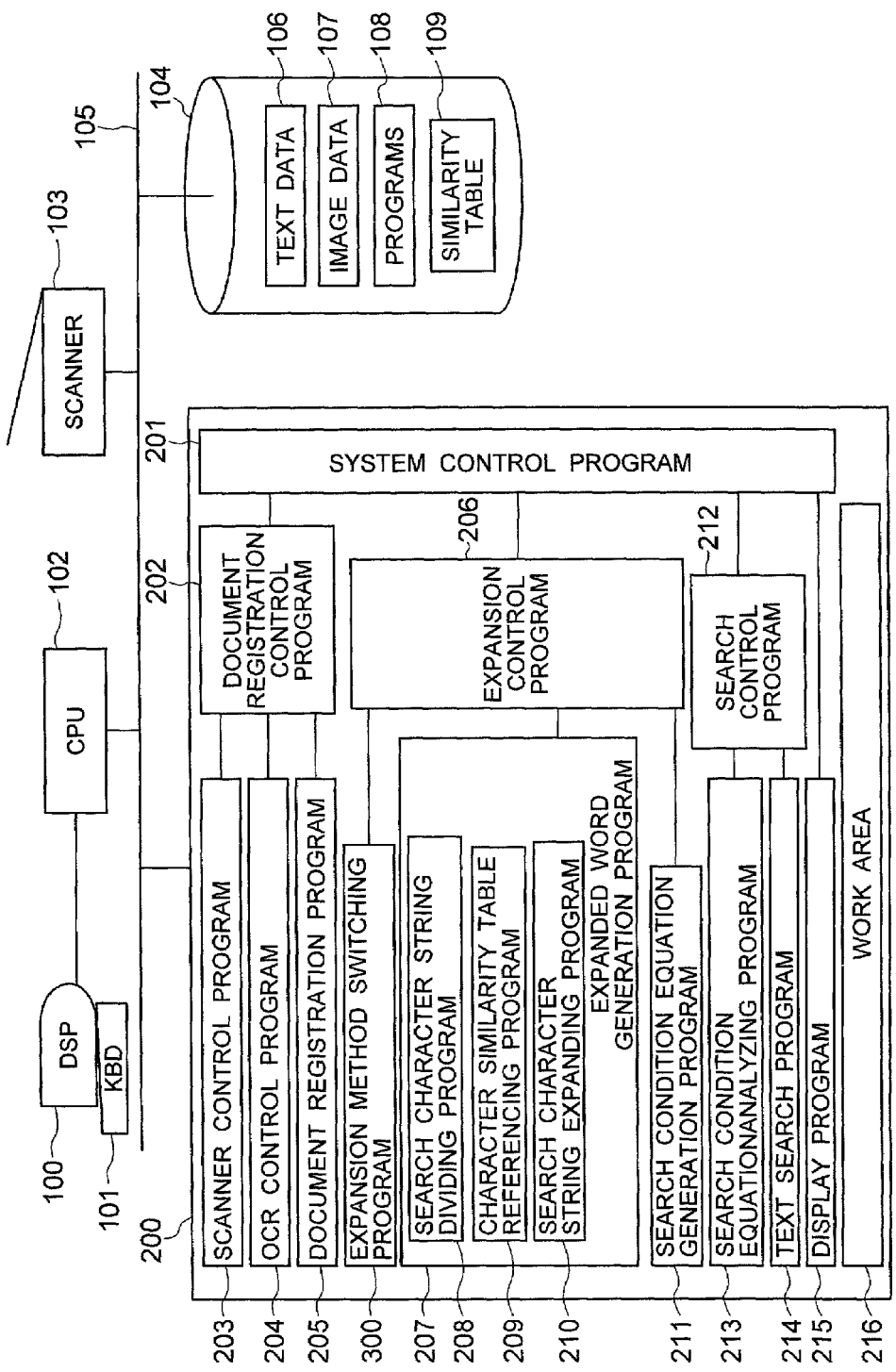
FIG. 10 is a configuration diagram of a document retrieval system according to a second embodiment.

FIG. 10 shows a configuration of the second embodiment. The second embodiment has basically the same configuration as the first embodiment, except that a expansion method switching program 300 is added to the expansion control program 206.

Figure 11:
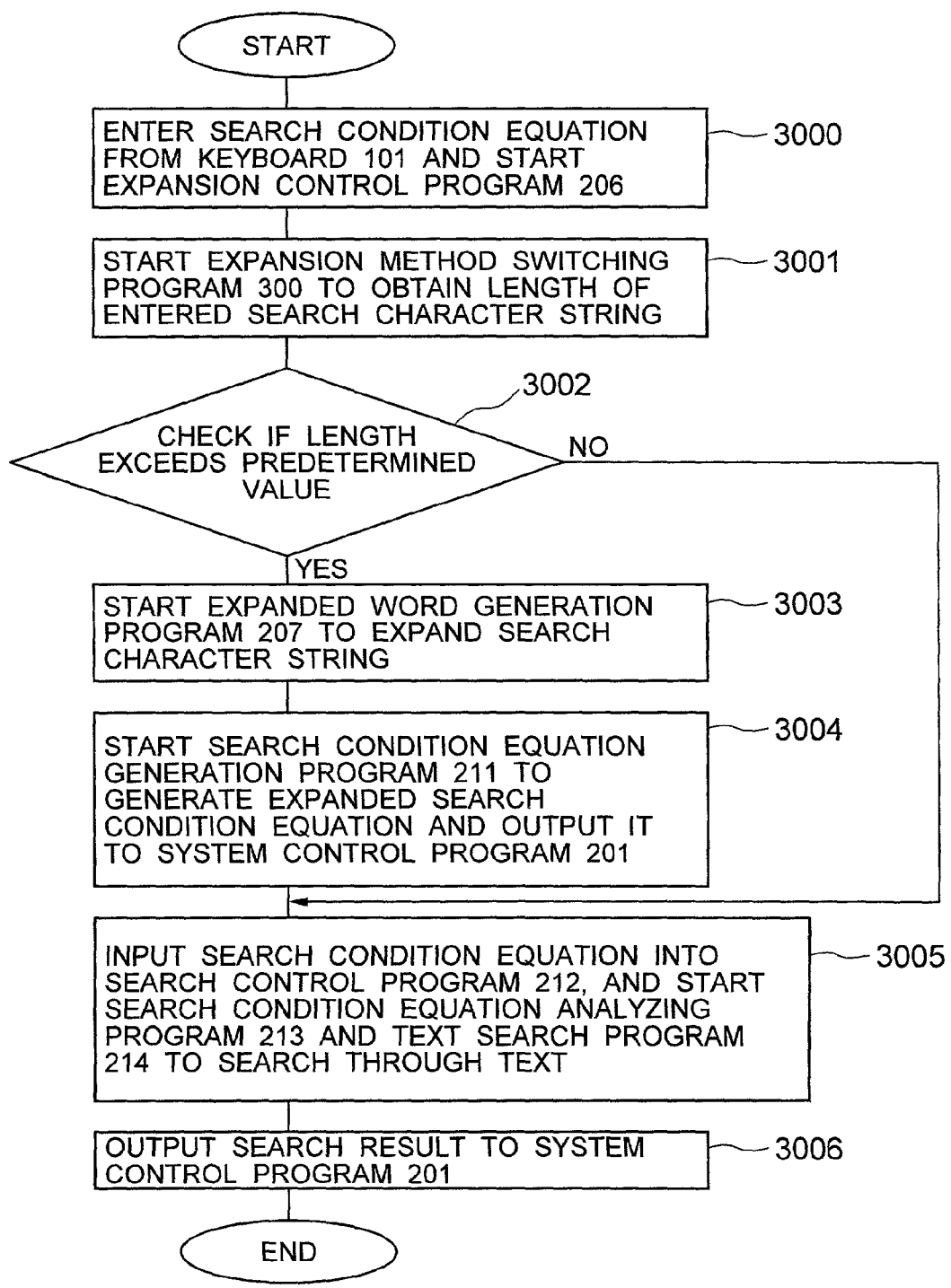
FIG. 11 is a flow chart showing a search procedure in the second embodiment.

The document registration method is similar to that of the first embodiment and is not described here. The search method will be explained by referring to FIG. 11.

When a search condition equation is entered from the keyboard 101 to perform a search, the system control program 201 starts the expansion control program 206 (step 3000). The expansion control program 206 first starts the expansion method switching program 300 to take in the length of the entered search character string (step 3001). Then, the length of the entered search character string is checked (step 3002). If the length does not exceed a predetermined length, the word expansion is not performed and the program proceeds to (step 3005) while maintaining the entered search condition equation. If the predetermined length is exceeded, the program moves to (step 3003). The expansion control program 206 starts the expanded word generation program 207 to generate a plurality of expanded words from the entered search character string and output them to the work area 216 (step 3003). Next, the expansion control program 206 starts the search condition equation generation program 211 to expand the expanded words into a search condition equation, which represents a logical sum (OR) set of the expanded words read into the work area 216, and output the search condition equation to the system control program 201 (step 3004). Next, the system control program 201 starts the search control program 213 which takes in the original search condition equation or the output search condition equation. Then this control program successively starts the search condition equation analyzing program 212 and the text search program 214 to perform a text search according to the search condition equation (step 3005). As a final step, the result of search is output to the system control program 201 (step 3006). The search processing in the document search system of this embodiment has been described above.

The search method described above will be detailed by taking "大" as an example search character string. In this example, a predetermined length value for the search character string expansion decision is set to 1.

When the search character string "大" is entered, the search character string length of 1 is taken in. Next, in the expansion decision, because the length of the retrieved search character string is not greater than the predetermined length value, the expanded word generation processing is not executed. Hence, a search is made using the entered search character string "大". In this way, when the search character string is short, the search character string is not subjected to the expansion processing as it has been in the conventional technique. This can prevent the search result from including those documents which contain character strings of different meanings, thus reducing the search noise.

Further, not only can this embodiment preset the predetermined length value for the expansion decision, it can also adjust the predetermined length value freely during the search. It is also possible to change the predetermined length value for the expansion decision according to the kind of characters, for example, to 1 character when the search character string is an ideogram or character such as kanji or Chinese character and to 2 characters when it is a phonogram or letter such as alphabet.

The second embodiment has been described above. In the search allowing for OCR recognition errors, this embodiment can perform a highly accurate search without increasing the search noise when the search character string is short in length.

Next, a third embodiment of this invention will be described.

In addition to the processing performed by the first embodiment, the third embodiment generates entry characters in the similarity table by extracting a part of combinations of all character codes. This produces an effect of reducing a file capacity of the similarity table.

That is, in the first embodiment, the entry characters in the similarity table are generated from the learning data consisting of all character code combinations. In that case, assuming that there are a total of about 8,000 Japanese character codes and that each entry character has 10 candidate characters, the 2-character string similarity table has the following capacity:

(combinations of all characters)×4 [bytes] (because each character string consists of 2 characters)×10 [candidate characters]=8,000×8,000×4×10=2.56 G [bytes]

Third embodiment on the other hand stores in the 2-character string similarity table only those character strings with high probability of being used as the search character string, thereby realizing a reduction in the capacity of the similarity table.

This third embodiment is basically similar to the first embodiment, except that, while the first embodiment generates the n-character (n≧2) candidate strings by combining all character codes, this embodiment generates candidate character strings from only the main character combinations likely to be used as the search character string. Hence, because there are entry characters that are not contained in the similarity table, exception processing is added to the similarity table referencing program 209. It is noted here that the major character combinations used in this embodiment are contemplated to be the combinations of first level characters.

Figure 12:
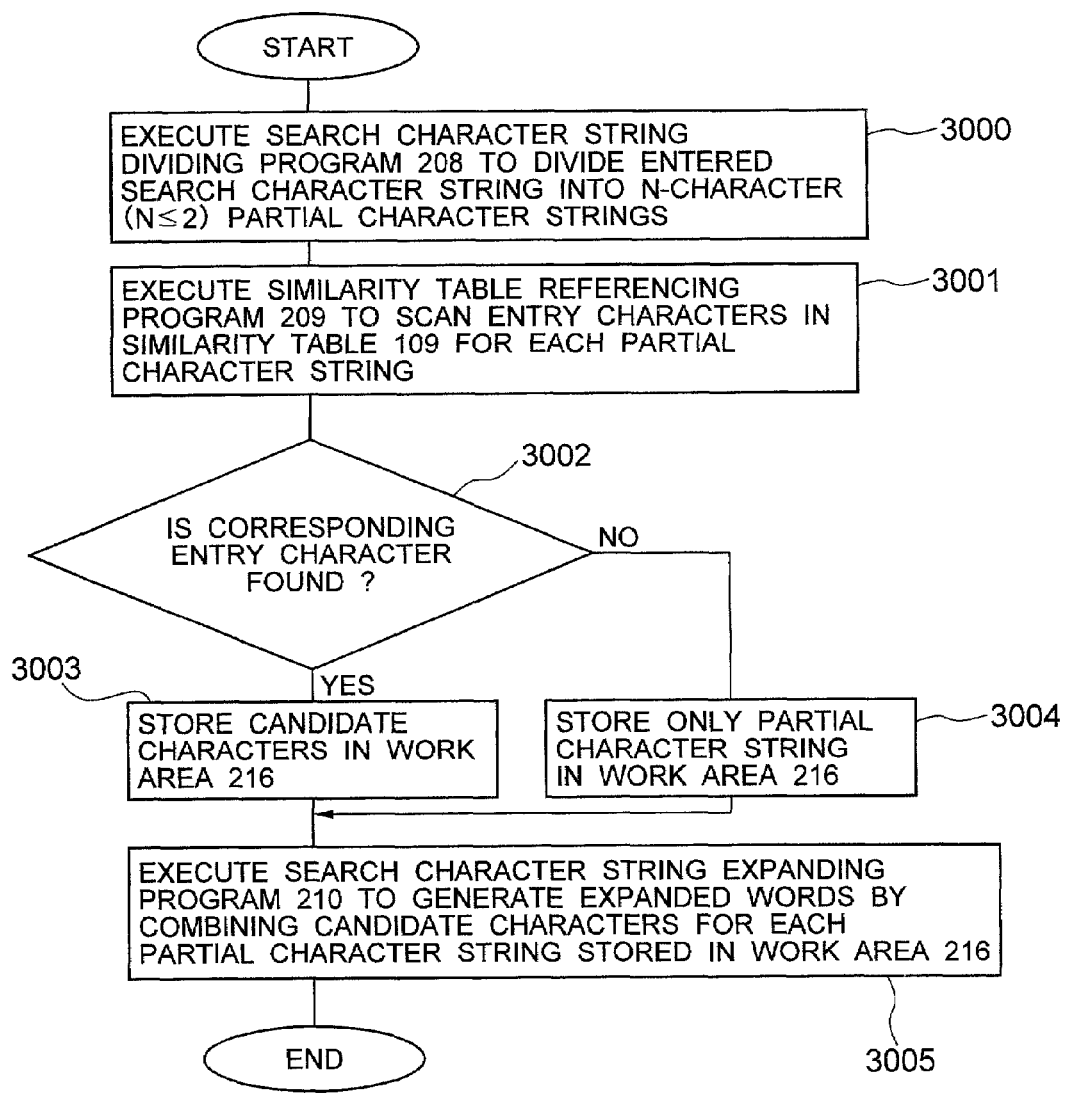
FIG. 12 is a flow chart showing a expanded word generation control procedure in a third embodiment.

Now, a expansion processing procedure using the similarity table of this embodiment, i.e., a new procedure added to the expanded word generation program 207, will be described by referring to FIG. 12.

The expanded word generation program 207 initiates the search character string dividing program 208 to divide the entered search character string into partial character strings each consisting of a predetermined number n of characters (n≧2) (step 3000). Next, the similarity table referencing program 209 is executed to scan the similarity table 109 to see if the partial character strings are among the entry characters in the table (step 3001). A check is made as to whether the corresponding entry characters exists in the table (step 3002). If so, the candidate characters are stored in the work area 216 (step 3003). If not, the partial character strings themselves are stored in the work area 216 (step 3004). As a final step, the search character string expanding program 210 is executed to read the candidate characters for each partial character string or the partial character strings from the work area 216 and combine them to generate a plurality of expanded words (step 3005). This is the procedure of the expansion processing in the document retrieval system.

Next, the file capacity of the similarity table containing major character combinations according to this embodiment will be explained. It is assumed that there are a total of about 3,000 first level characters and each entry character has 10 candidate characters. Then, the file capacity of the similarity table is:

(combinations of 1st level characters)×4 [bytes] (because each character string consists of 2 characters)×10 [candidate characters]=3,000×3,000×4×10=360 M [bytes]. This means that the similarity table of this embodiment needs only about ½ the capacity of the similarity table of the first embodiment.

Further, this embodiment may extract not only the combinations of first level characters but combinations of characters found in corpuses including newspaper and various literatures and further narrow down the combinations of junctural characters as languages.

The third embodiment has been described above. Because, in the search allowing for OCR recognition errors, this embodiment narrows the entry characters in the similarity table down to the combinations of major characters likely to be used as the search character string, the file capacity of the similarity table can be reduced significantly.

When looking up the search character string in the n-character-based similarity table, the method of the third embodiment has been described not to incorporate those character strings not listed in the n-character-based similarity table into a group of candidate character strings for use in generating the expanded words. It is also possible to prepare in advance an m-character-based similarity table (m<n) for parallel use with the n-character-based similarity table consisting of major character strings so that, for a character string not listed in the n-character-based similarity table, a reference can be made to the m-character-based similarity table to generate expanded words.

Next, a fourth embodiment of the present invention will be described.

Figure 13:
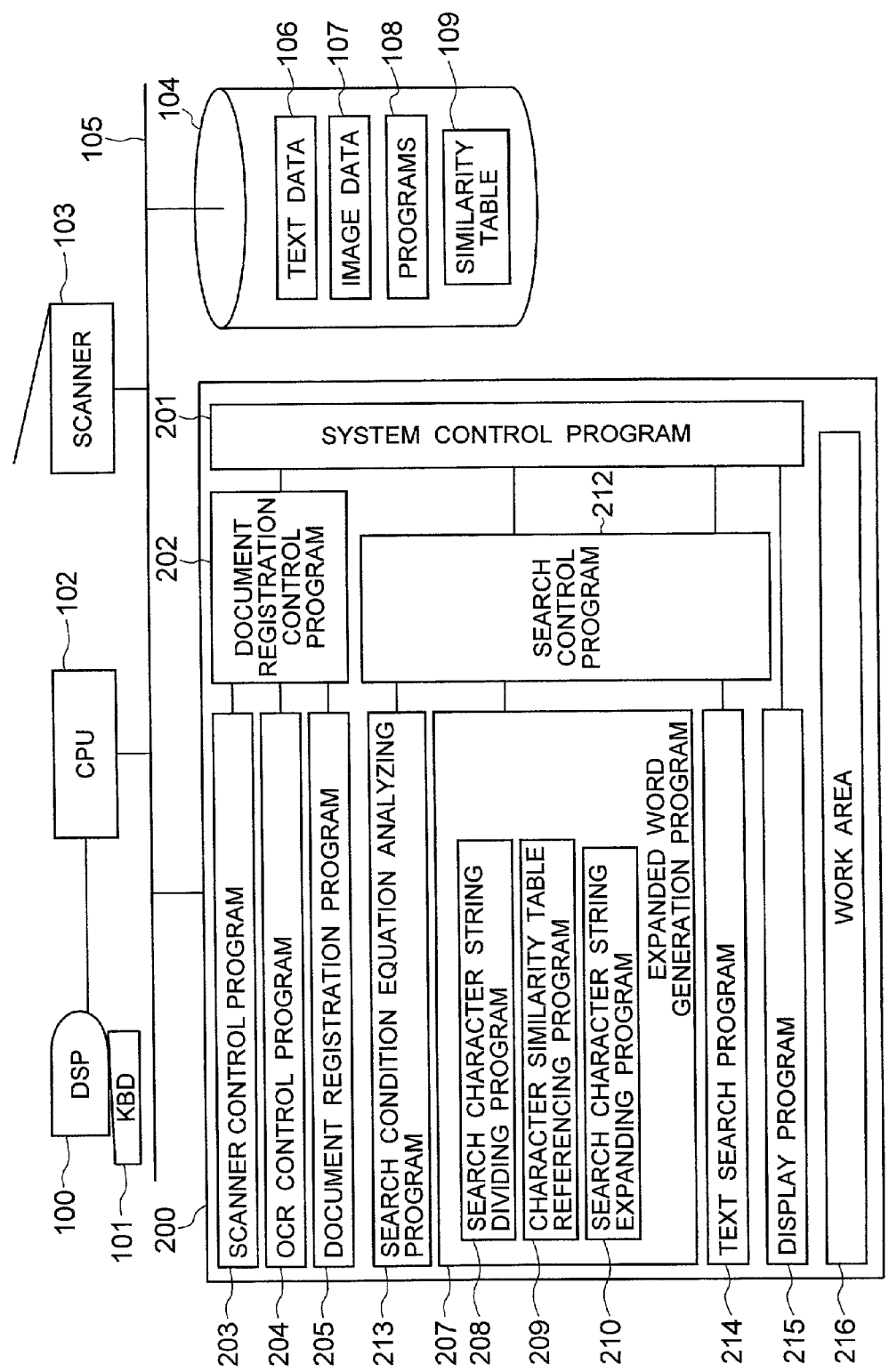
FIG. 13 is a configuration diagram of a document retrieval system according to a fourth embodiment.

In the first to third embodiment, the word expansion processing and the search processing are independent of each other. In the fourth embodiment, the search processing is expanded to include the word expansion processing. FIG. 13 shows a configuration of this embodiment. Unlike the preceding embodiments, the fourth embodiment is characterized in that, when performing a search, the search control program 212 also controls the word expansion processing. Further, since the expanded word generation from the search character string is performed in the search processing, the search condition equation generation program 211 for generating a new search condition equation is not required.

As described above, in a search performed on text data containing character recognition errors, which are produced by the OCR during the character-recognition operation on an image document, the number of expanded words is reduced by removing those n-character candidate words with low emergence probabilities from the similarity table and generating the expanded words using this table. This arrangement can realize a search in a practical search time while maintaining a high search precision.

It will be further understood by those skilled in the art that the foregoing description has been made on embodiments of the invention and that various changes and modifications may be made in the invention without departing from the spirit and scope the appended claims.

What is claimed is:

1. An computer apparatus for expanding a character string comprising:

a character string dividing device to divide an entered character string into a plurality of partial character strings each having a plurality of characters, the character string being entered in order to search image information of documents;

a similarity table previously storing groups of similar partial character strings, each of the groups of similar partial character strings each consisting of a plurality of characters and arranged in an order of magnitude of emergence probabilities in each group, each of the groups of similar partial character strings being derived from each of the plurality of partial character strings obtained from the character string dividing device by changing at least one of characters of each partial character string to a different character which is similar in shape;

a referring device that refers to the similarity table to obtain each of the groups of the similar partial character strings;

a search term expansion device to combine a plurality of similar partial character strings given by the referencing device into expanded words, each having a product of the emergence probabilities of the similar partial character strings, and store them in an expanded word table.

2. The apparatus according to claim 1, wherein the similarity table is arranged in the order of their emergence probability in each group and has only those similar partial character strings whose emergence probabilities are greater than a predetermined value.

3. The apparatus according to claim 1, wherein, when the similarity table does not include similar different characters, the referencing device gives the partial character strings obtained from the character string diving device to the expansion device, and the search term expansion device uses the partial character strings to produce the expanded words.

4. The apparatus according to claim 1, wherein, when the similarity table does not have entries for the partial character strings obtained from the character string diving device, the referencing device references a second similarity table which stores in advance second groups of similar partial character strings arranged in the order of magnitude of their emergence probability in each group, each of the second groups of similar partial character strings being derived from each of short partial character strings made up of a smaller number of characters than the partial character strings obtained from the character string diving device by changing at least one of the characters of each short partial character string to a different character which is similar in shape.

5. The apparatus according to claim 1, wherein, when the entered character string is not divisible into the plurality of partial character strings without a remainder, characters adjoining each character of the remainder character string are added to the each character so that resultant character strings have the same number of characters as the divided character strings, and the character strings thus obtained are added to the plurality of partial character strings.

6. In a computer system for retrieving a document containing a search character string specified by an operator in a search through text documents that are produced by performing character recognition processing on image documents, a search character string expanding method comprising:

a search character string dividing step of dividing the entered search character string into partial character strings each consisting of a predetermined number n of characters (n≧2);

a similarity table referencing step of checking the n-character partial character strings (n≧2) against an n-character-based similarity table, the n-character-based similarity table being generated in advance by storing character strings of similar character shapes that are highly likely to be erroneously recognized, each consisting of a plurality of characters and arranged in an order of magnitude of emergence probabilities in each group; and a search character string expanding step of extracting groups of similar character strings by checking the partial character strings making up the search character string against the n-character-based similarity table and combining the extracted similar character strings to generate expanded words, each having a product of the emergence probabilities of the similar partial character strings.

7. A search character string expanding method according to claim 6, wherein entry characters in the n-character-based similarity table include only a part of partial character strings each of which is a combination of n characters.

8. A search character string expanding method according to claim 7, wherein when a partial character string making up the search character string is not found in the n-character-based similarity table, similar character strings to the partial character string are not extracted.

9. A search character string expanding method according to claim 7, wherein when a partial character string making up the search character string is not found in the n-character-based similarity table, an in-character-based similarity table, which is prepared in advance by storing similar in-character strings (m<n) of similar character shapes highly likely to be erroneously recognized, is referenced to generate expanded words.

10. A search character string expanding method according to claim 6, further including a expansion method switching step of calculating a length of the search character string and selecting between expanded word generation methods according to the search character string length.

11. A search character string expanding method according to claim 6 further comprising:

a search term expansion method switching step of calculating a length of the search character string; and selecting how to execute generating of expanded words from among expanded word generation methods according to the search character string length, wherein said expanded word generation methods include a method of adjusting the number of expanded search character strings.

12. A search character string expanding method according to claim 10, wherein the number of expanded character strings generated is adjusted according to the search character string length.

13. A search character string expanding method according to claim 11, wherein whether the expanded words are generated or not is determined according to the search character string length.

14. A search character string expanding method according to claim 13, wherein setting information is provided for selecting between the expanded word generation methods.

15. A search character string expanding method according to claim 14, further comprising:

a text search step of executing a search by using as a search condition a logical sum of expanded search character strings obtained.

16. A program read into and running on a computer to expand a character string, wherein the character string is entered to search image information of documents, the program comprising:

a character string dividing step of dividing the entered character string into a plurality of partial character strings each having a plurality of characters;

a similarity table previously storing groups of similar partial character strings each consisting of a plurality of characters and arranged in an order of magnitude of emergence probabilities in each group, each of the groups of the similar partial character strings being derived from each of the plurality of partial character strings obtained from the character string dividing device by changing at least one of the characters of each partial character string to a different character which is similar in shape;

a referencing step of referencing the similarity table previously storing groups of similar partial character strings, each consisting of a plurality of characters and arranged in an order of magnitude of emergence probabilities in each group, each of the groups of the similar partial character strings being derived from each of the plurality of partial character strings obtained from the character string dividing step by changing at least one of the characters of each partial character string to a different character which is similar in shape; and an expansion step of combining the plurality of similar partial character strings given by the referencing step into expanded words, each having a product of the emergence probabilities of the similar partial character strings, and store them in an expanded word table.

17. The program according to claim 16, wherein the similarity table is arranged in the order of their emergence probability in each group and has only those similar partial character strings whose emergence probabilities are greater than a predetermined value.

18. The program according to claim 16, wherein, when the similarity table does not include similar but different characters, the referencing step gives the partial character strings obtained from the character string diving step to the expansion step, and the expansion step uses the partial character strings to produce the expanded words.

19. The program according to claim 16, wherein, when the similarity table does not have entries for the partial character strings obtained from the character string diving step, the referencing step references a second similarity table which stores in advance second groups of similar partial character strings arranged in the order of magnitude of their emergence probability in each group, each of the second groups of similar partial character strings being derived from each of short partial character strings made up of a smaller number of characters than the partial character strings obtained from the character string diving step by changing at least one of the characters of each short partial character string to a different character which is similar in shape.

20. The program according to claim 16, wherein, when the entered character string is not divisible into the plurality of partial character strings without a remainder, characters adjoining each character of the remainder character string are added to the each character so that resultant character strings have the same number of characters as the divided character strings, and the character strings thus obtained are added to the plurality of partial character strings.

* * * * *